(12) United States Patent
Yoshimura

(10) Patent No.: US 7,145,690 B1
(45) Date of Patent: Dec. 5, 2006

(54) IMAGE CORRECTION DEVICE

(75) Inventor: Tomonari Yoshimura, Kyoto (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/255,987

(22) Filed: Feb. 23, 1999

(30) Foreign Application Priority Data

Feb. 23, 1998 (JP) .................. 10-040062

(51) Int. Cl.
*H04N 1/00* (2006.01)
(52) U.S. Cl. .................. 358/1.9; 358/406; 358/468
(58) Field of Classification Search .................. 358/1.9, 358/408, 468, 523, 406, 504; 382/318
See application file for complete search history.

(56) References Cited

U.S. PATENT DOCUMENTS

| 5,760,913 A * | 6/1998 | Falk ........................... 358/504 |
| 6,271,938 B1 * | 8/2001 | Hikita ........................ 358/468 |

FOREIGN PATENT DOCUMENTS

| JP | 5-236276 | 9/1993 |
| JP | 6-237380 | 8/1994 |
| JP | 6-334863 | 12/1994 |
| JP | 7-177367 | 7/1995 |
| JP | 8-102856 | 4/1996 |
| JP | 8-293023 | 11/1996 |

OTHER PUBLICATIONS

Japanese Office Action mailed Oct. 11, 2005, directed to counterpart JP Application No. 10-040062.

* cited by examiner

*Primary Examiner*—Thomas D. Lee
(74) *Attorney, Agent, or Firm*—Morrison & Foerster LLP

(57) ABSTRACT

An image correction device for use in an image forming system which is connectable to a plurality of image readers and image forming apparatuses, the image correction device is capable of suppressing distortion in the image forming system by using optimum image correction information corresponding to mechanical differences and changes over time in the plurality of image readers and image forming apparatuses, the image correction device includes a discriminating device for discriminating the image readers from the image forming apparatuses which are connected to the image correction device, memory means for storing correction data relating to combinations of the image readers and image forming apparatuses and data correction means for correcting image data output from an image reader using the correction data relating to a specific combination of image reader and image forming apparatus and for outputting the corrected data to an image forming apparatus.

21 Claims, 10 Drawing Sheets

EXAMPLE OF IMAGE CORRECTION INFORMATION (RGB DATA)

| READ DATA | RED DATA AFTER CORRECTION | GREEN DATA AFTER CORRECTION | BLUE DATA AFTER CORRECTION |
|---|---|---|---|
| 0 | 4 | 1 | 2 |
| 1 | 4 | 2 | 3 |
| 2 | 5 | 2 | 4 |
| 3 | 5 | 3 | 5 |
| 4 | 5 | 3 | 5 |
| 5 | 6 | 3 | 6 |
| ~ | ~ | ~ | ~ |
| 250 | 251 | 250 | 251 |
| 251 | 253 | 250 | 253 |
| 252 | 254 | 251 | 254 |
| 253 | 254 | 251 | 254 |
| 254 | 255 | 252 | 255 |
| 255 | 255 | 253 | 255 |

FIG.7(a)

EXAMPLE OF IMAGE CORRECTION INFORMATION (CMYK DATA)

| READ DATA | CYAN DATA AFTER CORRECTION | MAGENTA DATA AFTER CORRECTION | YELLOW DATA AFTER CORRECTION | BLACK DATA AFTER CORRECTION |
|---|---|---|---|---|
| 0 | 4 | 1 | 2 | 1 |
| 1 | 4 | 2 | 3 | 2 |
| 2 | 5 | 2 | 4 | 2 |
| 3 | 5 | 3 | 5 | 3 |
| 4 | 5 | 3 | 5 | 5 |
| 5 | 6 | 3 | 6 | 6 |
| ~ | ~ | ~ | ~ | ~ |
| 250 | 251 | 250 | 251 | 251 |
| 251 | 253 | 250 | 253 | 253 |
| 252 | 254 | 251 | 254 | 254 |
| 253 | 254 | 252 | 255 | 254 |
| 254 | 255 | 252 | 255 | 255 |
| 255 | 255 | 253 | 255 | 255 |

FIG.7(b)

IMAGE CORRECTION DEVICE

CROSS-REFERENCE TO RELATED APPLICATIONS

This application is based on Patent Application No. HEI 10-40062 filed in Japan, the content of which is hereby incorporated by reference.

FIELD OF THE INVENTION

The invention relates to an image correction device and a medium for storing an image correction program. Specifically, the invention relates to a device for correcting images and a medium for storing a program for correcting images in a system including an image transmission device and a plurality of image readers, a plurality of image forming apparatuses or a plurality of terminals connected together via a communications line.

BACKGROUND OF THE INVENTION

In a conventional image forming apparatus and image reader, when an image is read optically and printed on a paper sheet, the printing results vary due to changes over time and mechanical differences of the image forming apparatus and image reader. When these variations occur, it becomes necessary to perform image correction such as color correction and the like.

In the field of image transmission, methods have been proposed for image correction by storing image correction information relating to individual image readers and image forming apparatuses on a client terminal or server, and combining these information to achieve image correction.

Furthermore, in the field of color copiers, methods have been proposed for printing a correction image via the image forming apparatus by placing an image correction print object manually on an image reading table, and reading the correction image via the image reader to automatically change the image correction information.

However, since correction methods used in conventional image transmission devices utilize image information relating to individual image readers or image forming apparatuses, optimum image correction information of combined image readers and image forming apparatuses is not obtained, and accurate image correction is not achieved. A further disadvantage arises in that image quality deteriorates when discrepancies occur in the image correction information due to changes over time and mechanical differences between the image reader and image forming apparatus.

As to color copiers, another disadvantage is image correction is limited to the image reader and image forming apparatus within a particular color copier, and image correction cannot be attained when image information read by the image reader of a particular color copier is transmitted for printing by another image forming apparatus, and conversely, when image information read by another image reader is transmitted for printing by that particular color copier.

SUMMARY OF THE INVENTION

The invention provides an image correction device capable of supporting high quality image formation and suppressing distortion caused by the device by using optimum image correction information corresponding to mechanical differences and changes over time in image readers and image forming apparatuses.

The image correction device of the invention provides an image correction device for use in an image forming system which can be connected to a plurality of image readers and a plurality of image forming apparatuses, the image correction device comprises memory means for storing correction data relative to combinations of specific image readers and image forming apparatuses, and data correction means for correcting image data output from an image reader using the correction data when executing image formation via a combination of a specific image reader and image forming apparatus and inputting the corrected data to the image forming apparatus.

The connectability of a plurality of image readers and image forming apparatuses includes connection of a plurality of image forming apparatuses to a single image reader and connection of a plurality of image readers to a single image forming apparatus.

In the embodiments described hereinafter, the image transmission device (a so-called server or controller) functions as the image correction device of the invention in a system connected to a network of a plurality of image readers and image forming apparatuses, i.e., the image transmission device handles image correction data for the whole network.

The image forming system includes a system of a single data processing device (for example, a microcomputer) connected to a plurality of image readers and image forming apparatuses. In this instance, the functions of the image correction device are performed by the single data processing device.

In the following discussion of the various embodiments, correction refers to gradient correction, resolution correction, density correction, color correction and various combinations thereof in the case of color printing. In the case of monochrome printing, correction refers to halftone correction, resolution correction, density correction and various combinations thereof.

The data correction means may correct image data from the image reader based on updated correction data stored in memory means, and output corrected data to an image forming apparatus. As a result, changes over time of the device are corrected and this assures the quality of formed images.

Similarly, there is concern that discrepancies may arise in the correction data due to changes in the device over time when a set time interval has elapsed after the creation of the correction data. For this reason, correction data regeneration requesting means may be provided to request that correction data be regenerated when a set time interval has elapsed from the date or time that new updated correction data are stored in memory means.

Although correction data relating to some combinations of image readers and image forming apparatuses are not available, it is expected that image quality can be assured by using image data of devices having similar characteristics among combinations of devices for which correction data have been stored beforehand. That is, search means may be provided beforehand such that when correction data relating to a combination of image reader and image forming apparatus are not stored in memory means, a search is performed for the correction data relating to a combination of image reader and image forming apparatus most similar to the combination of image reader and image forming apparatus where correction data are available, so as to use the correction data of the most similar combination of image reader and image forming apparatus.

Although the image correction device of the invention is a hardware device in the embodiments described below, it is to be understood that this image correction device may be realized via software, or via a data processing device or the like which may be installed and readily realize the function of the image correction device of the invention, or a general data processing device may be used as the image correction device.

The invention further provides a storage medium for storing program software of an image correction device used in an image forming system connectable to a plurality of image readers and a plurality of image forming apparatuses, wherein the storage medium for storing program software of the image correction device stores correction data relating to specific combinations of image readers and image forming apparatuses, and stores a data correction control program for correcting image data output from a specific device using the correction data and transmitting the corrected data to the image forming apparatus when image formation is executed via a combination of a specific image reader and image forming apparatus.

The data correction control program may also include a program for correcting image data from an image reader based on updated correction data. A correction data regeneration request program may also be stored beforehand for requesting regeneration of correction data when a specific time period has elapsed from the date or time of generation of updated correction data stored by memory means on the storage medium. When correction data relating to a combination of image reader and image forming apparatus has not been stored by memory means on the storage medium, a search control program may be stored beforehand so as to search for correction data of a combination of the most similar image reader and image forming apparatus to the image reader and image forming apparatus so as to use this correction data as the correction data.

These and other features and advantages of the invention will become apparent from the following description taken in conjunction with the accompanying drawings which illustrate specific embodiments of the invention.

BRIEF DESCRIPTION OF THE DRAWINGS

In the following description, like parts are designated by like reference numbers throughout the several drawings.

FIGS. 7A and 7B show examples of tables of image correction data used for image correction;

DETAILED DESCRIPTION OF THE INVENTION

The preferred embodiments of the invention are described hereinafter by way of specific examples with reference to the accompanying drawings.

Figure 1:
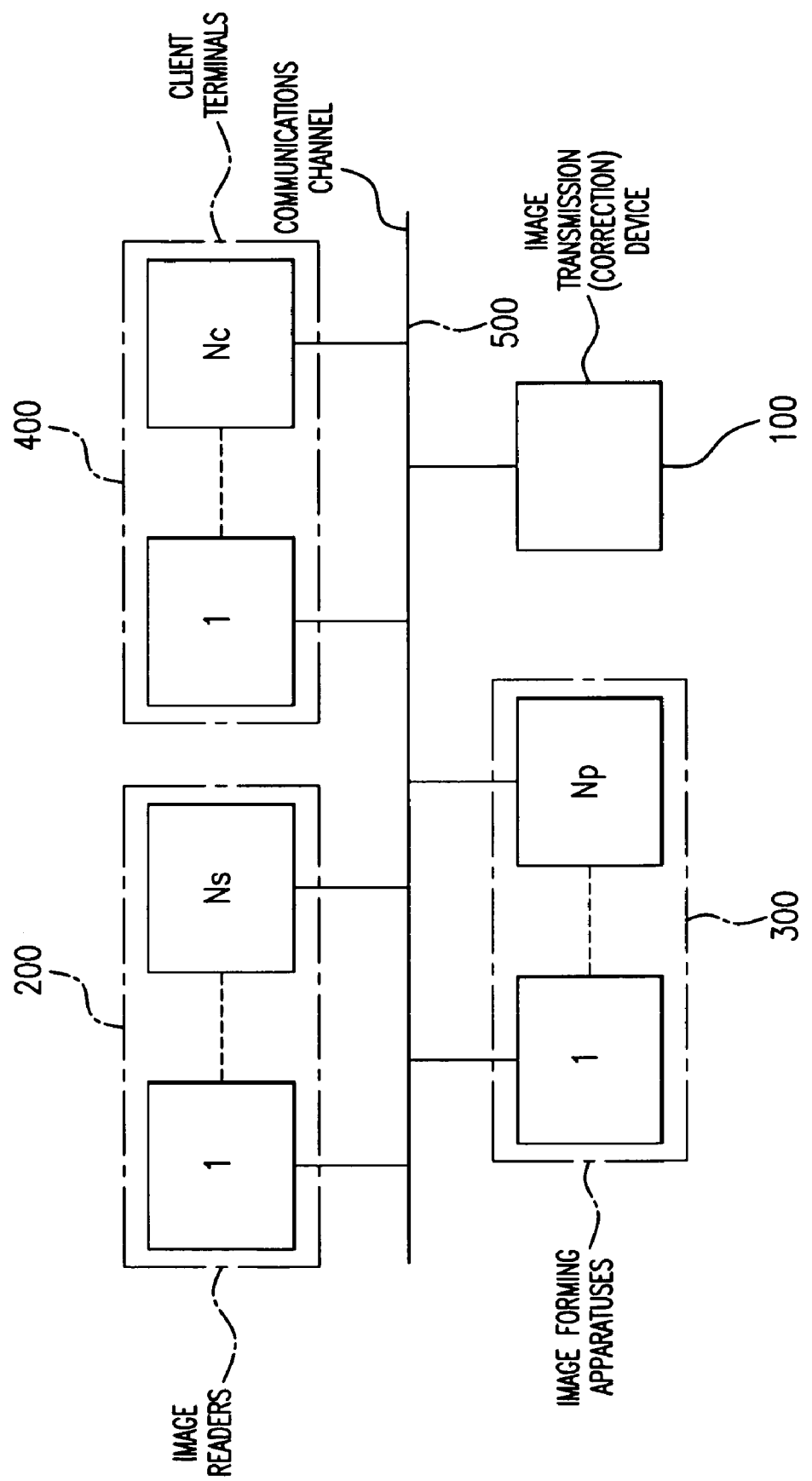
FIG. 1 shows the overall construction of an image forming system using an image correction device of the invention.

FIG. 1 shows the overall construction of an example of the main system. This main system comprises an image transmission device 100, a plurality of image readers 200 numbered 1 through Ns, a plurality of image forming apparatuses 300 numbered 1 through Np, a plurality of client terminals 400 numbered 1 through Nc, and a communications channel 500. Each of devices 100, 200, 300 and 400 are connected via communications channel 500 so as to be capable of sending and receiving image information and control information over communications channel 500.

Image reader 200 is a scanner or digital camera, for example, for converting optical data of a specific subject to electrical signals to be transmitted as digital image data to another device via communications channel 500.

Image forming apparatus 300 is a printer, for example, for receiving image data via communications channel 500, and for forming an image on paper via ink or toner using the received image data.

Client terminal 400 is typically a microcomputer, for example, for executing various display and editing processes as necessary relative to the image data obtained from image reader 200, for transmitting the image data to image forming apparatus 300 for printing or for transmitting image data to another client terminal.

Image transmission device 100 is provided for controlling data transmitted among image readers 200, image forming apparatuses 300 and client terminals 400, and for controlling the operation of the various devices in accordance with commands issued from client terminals 400.

Image transmission device 100 further stores image correction information relating to combinations of image readers 200 and image forming apparatuses 300, selects suitable correction information for image readers 200 and image forming apparatuses 300 and executes the image correction process.

Image transmission device 100 may be a special device or may be realized as a microcomputer incorporating software for communications control, i.e., a server or a microcomputer used as a client terminal.

Figure 2:
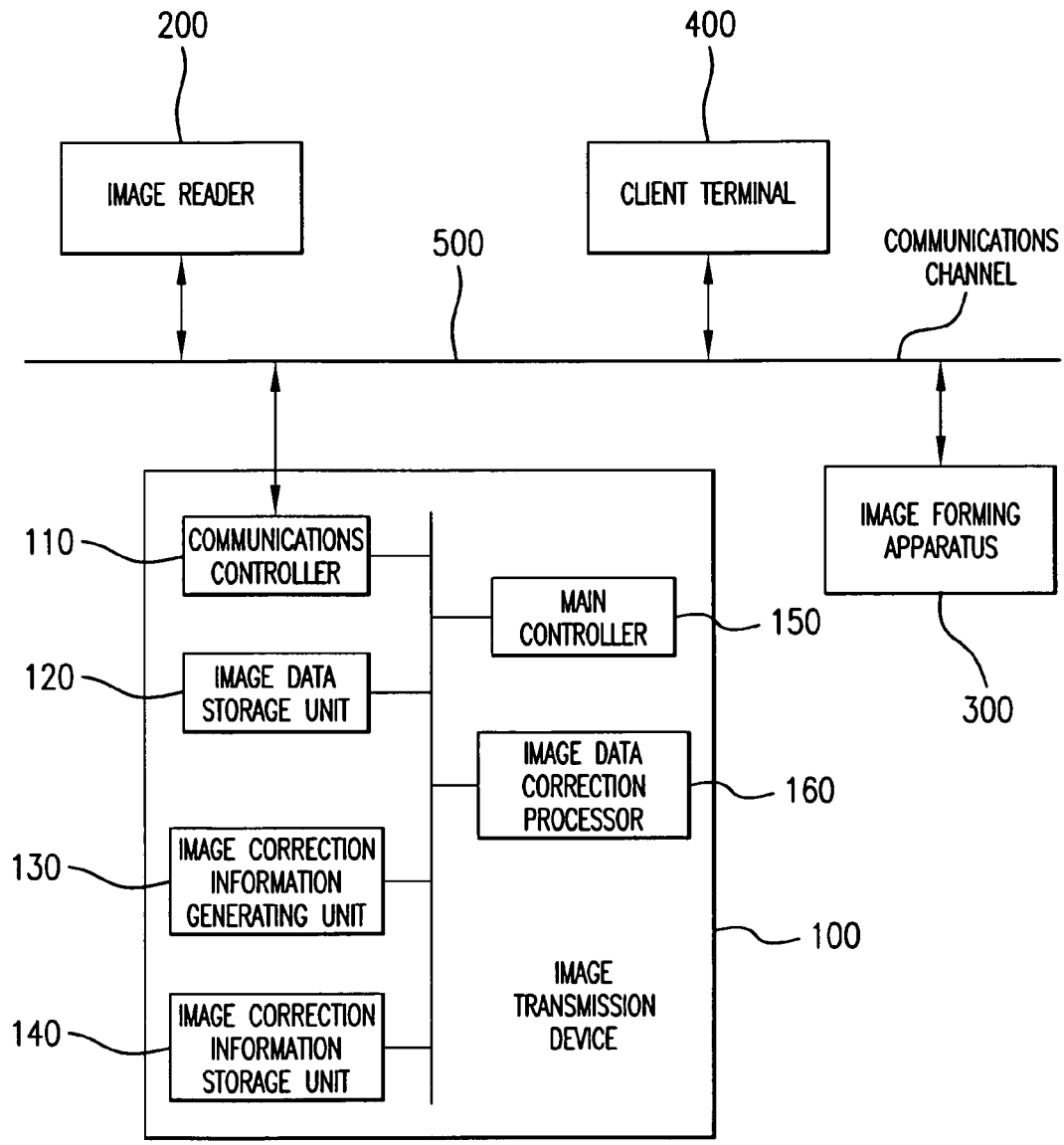
FIG. 2 shows the basic construction of the image transmission device of FIG. 1.

FIG. 2 shows the basic construction of image transmission device 100, which comprises a communications controller 110, an image data storage unit 120, an image correction information generating unit 130, an image correction information storage unit 140, a main controller 150 and an image data correction processor 160.

Communications controller 110 transmits and receives image data and device control information via communications channel 500 so as to exchange the required data with main controller 150 and image data storage unit 120.

Image data storage unit 120 comprises random access memory (RAM), a hard disk or the like. Image data storage unit 120 stores image data obtained from image reader 200 or client terminal 400, and stores image data for transmission to image forming apparatus 300 and client terminal 400.

Image correction information generating unit 130 reads the image used for correction via image reader 200 when image correction information is generated, compares first image data stored in image data storage unit 120 with second image data stored in image data storage unit 120, the first and second image data are obtained by reading with image reader 200 an image printed by image forming apparatus 300, and generates and stores image correction information in image correction information storage unit 140. Processes executed by image correction information generating unit 130 are described in detail later.

Image data correction processor 160 executes the correction processes on image data stored in image data storage unit 120 using suitable image correction data among image correction information stored in image correction information storage unit 140 in accordance with the combination of image reader 200 used for reading and image forming apparatus 300, and stores the corrected image data in image data storage unit 120. The processing executed by image data correction processor 160 is described in detail later.

The flow of data and processing of each unit is controlled by main controller 150.

Figure 3:
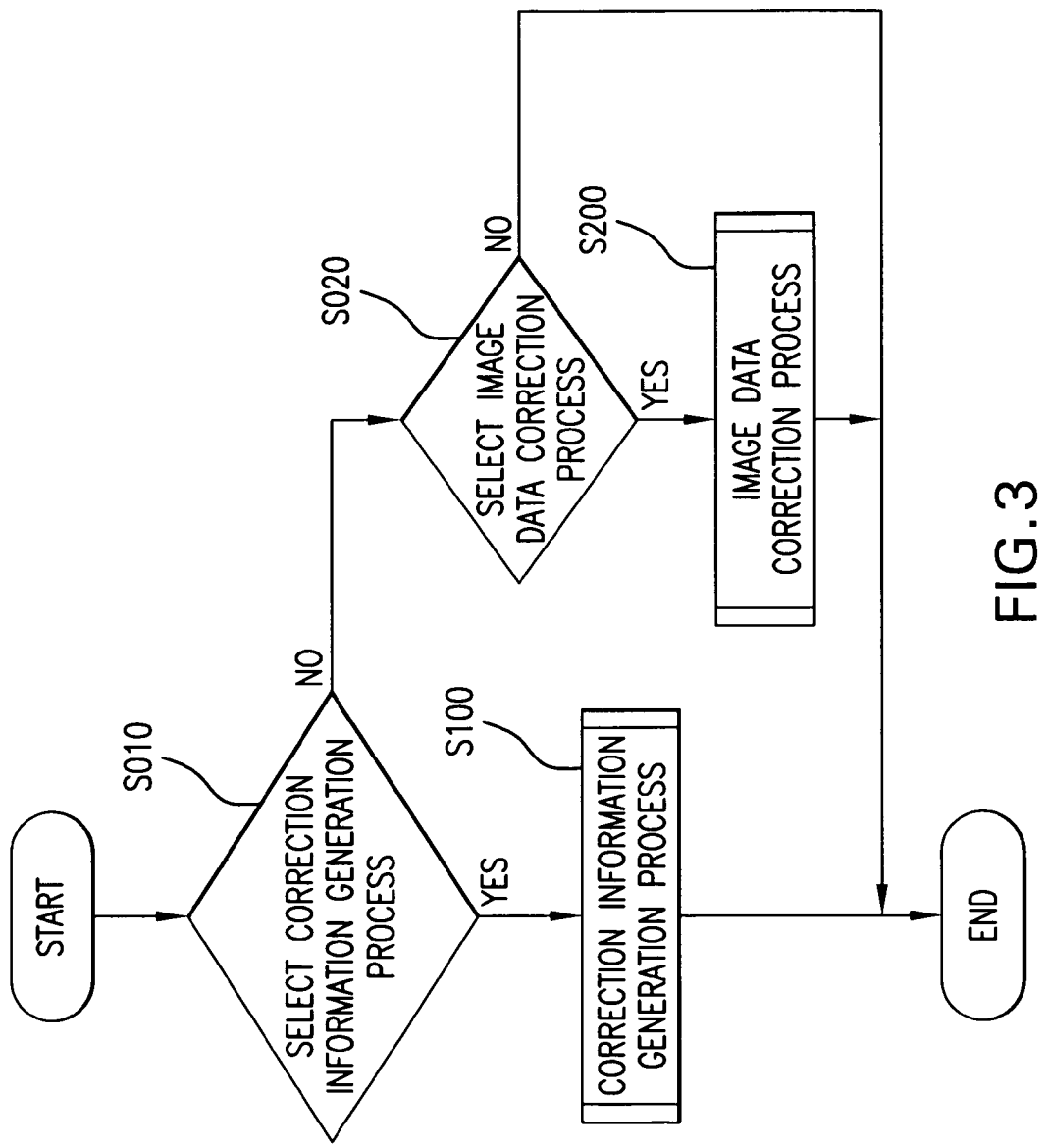
FIG. 3 is a flow chart of the general process of the image transmission device.

FIG. 3 shows the flow of the overall process of the image transmission device. The process is divided into two steps comprising a correction information generation process step S100 executed by image correction information generating unit 130 and an image data correction process step S200 executed by image data correction processor 160, and selection of these processes is determined by main controller 150 (steps S010 and S020) in accordance with commands transmitted from client terminal 400 to communications controller 110 via communications channel 500.

Figure 4:
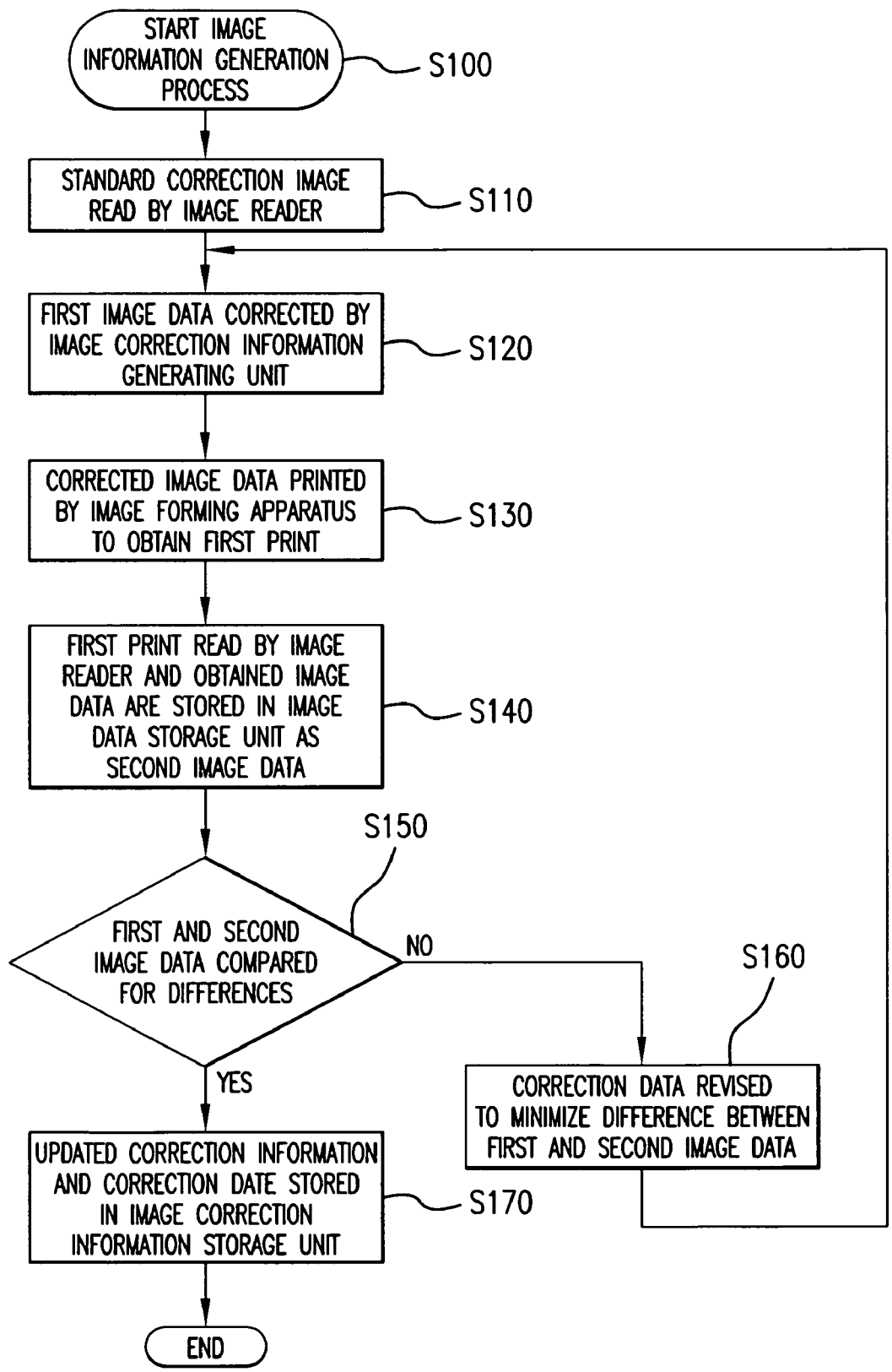
FIG. 4 is a flow chart showing the sequence of image correction information generation of the image correction generating unit in the image transmission device.

FIG. 4 shows the sequence of image correction information generation performed by image correction information generating unit 130. When the image information generation process starts (step S100), first, in step S110, a standard correction image is read by image reader 200, and the obtained image data are stored in image data storage unit 120 as first image data.

Then, the process continues to step S120, and first image data are corrected by image correction information generating unit 130 using updated correction data, then stored in image data storage unit 120.

In step S130, the corrected image data are printed by image forming apparatus 300 to obtain a first print. When there are no updated correction data, the image data are corrected using standard correction data.

In step S140, the first print is read using image reader 200, and the obtained image data are stored in image data storage unit 120 as second image data.

In step S150, the first and second image data stored in image data storage unit 120 are compared to determine whether or not there are differences below a preset constant standard value (which may be changed depending on use). Differences between the two sets of image data are determined by determining the maximum value of the difference in data such as color and the like, and determining whether or not the maximum value is less than a constant value. The mean square error may be used instead of the maximum value, insofar as the mean value of the data within a certain range is not data at the sample position. In other words, if the differences between the two sets of image data are determined to be below the mean square error, then the correction data are okay, if the differences are above the mean square error, then the correction data are to be updated.

When the image data difference is greater than a constant standard value, the process advances to step S160, and the correction data are revised so as to minimize the difference between the first and second image data. For example, the correction table is revised so that each color data of the second image data at each sample point becomes color data of the first image data, and the image data not included in the sample points are determined by an interpolation process of the image data obtained at the sample points. The processes from steps S120 to S160 are repeated until the image data difference in step S1150 is less than a constant standard value.

When the image data difference is less than a constant standard value, the process advances to step S170, and the updated correction information and correction date are stored in image correction information storage unit 140, whereupon the process ends. The stored image correction information is described in detail later.

Even when the image data difference is not less than a constant standard value in step S150, it is possible to interrupt the process when it is determined that there is minimal visual difference between the images, or when the difference is less than the previous difference.

Figure 5:
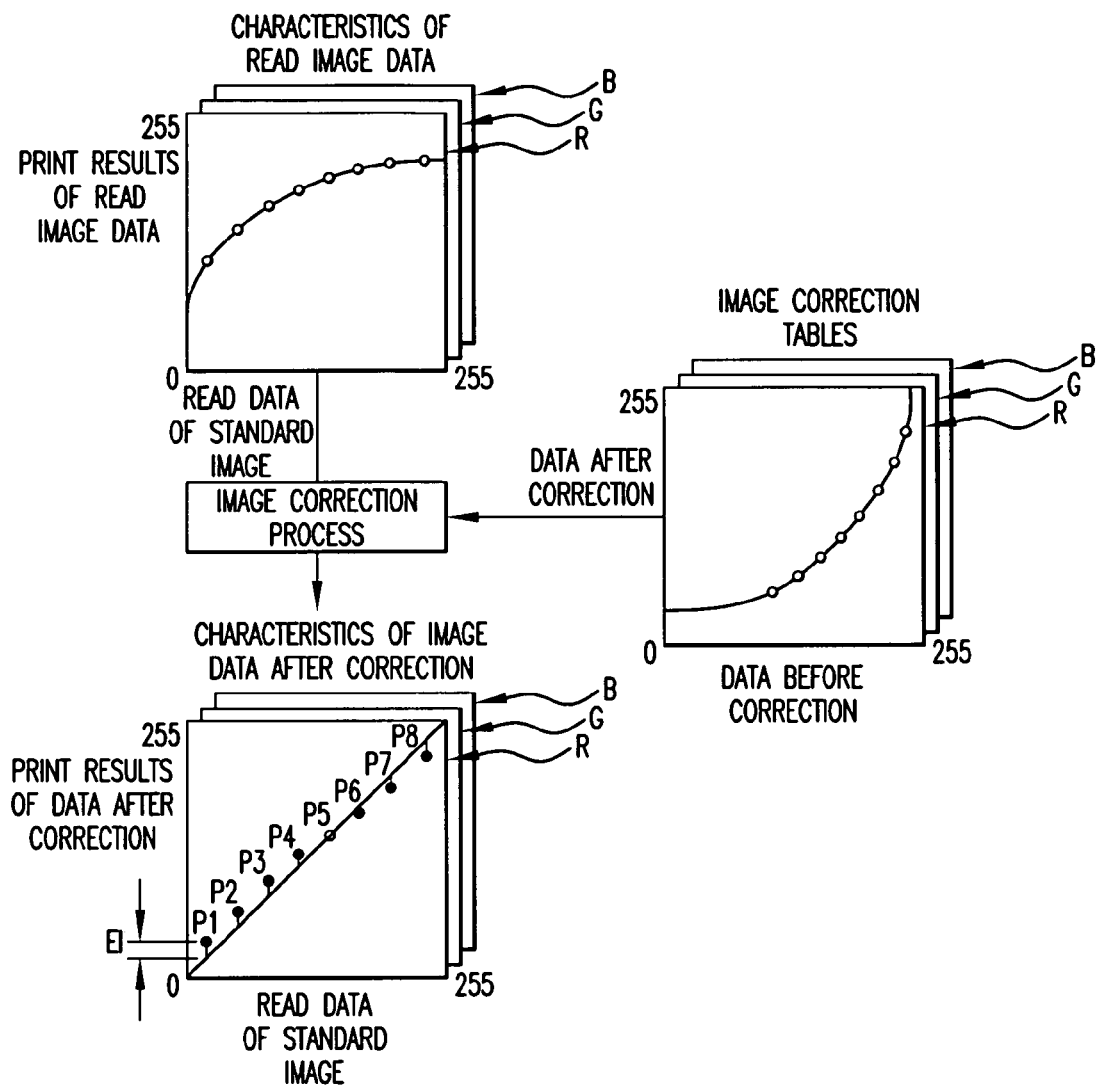
FIG. 5 shows an example of the correction data revision process in the sequence of the image correction information generation.
Figure 6:
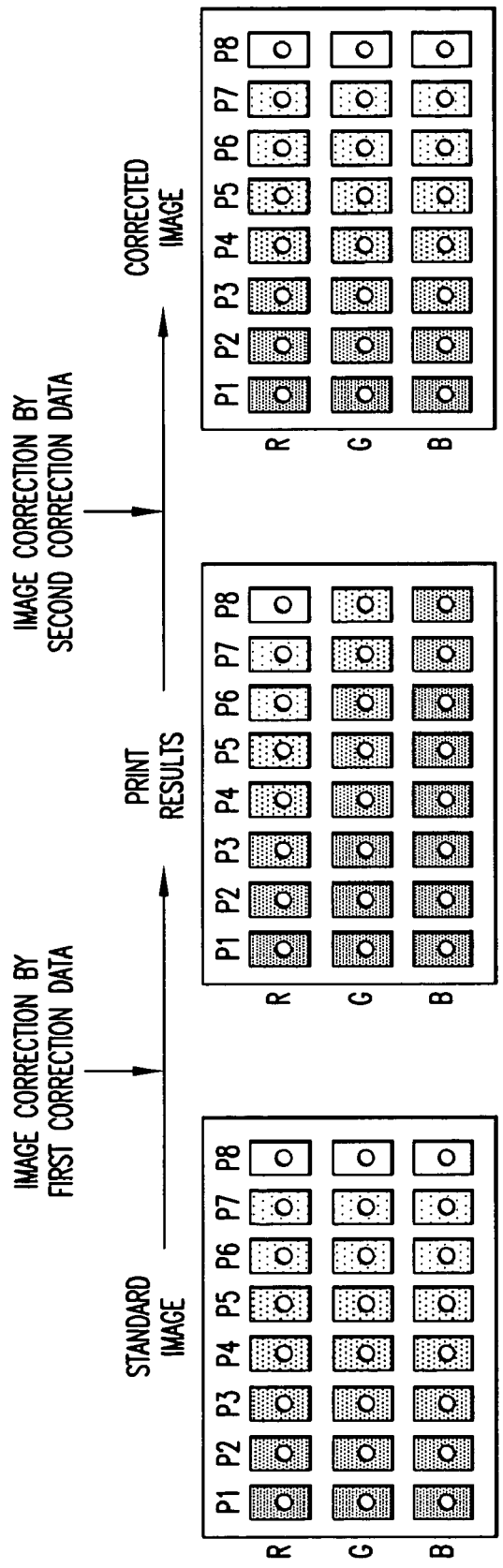
FIG. 6 shows another example of the correction data revision process in the sequence of the image correction information generation.

FIGS. 5 and 6 show examples of the correction data revision process of step S160. In the drawings, a standard image comprising red, green, blue and eight different density levels is read by the image reader to obtain RGB data of each point. For example, data of R, G and B components of each point P1 through P8 are determined. In the drawing, the black range is not shown, but this range is similar to the red, green and blue ranges. The standard image need not be identical to the one in the drawing, inasmuch as various colors such as cyan, magenta, yellow and the like may be used.

Similarly, RGB data of each point are obtained for the first and second prints using the same image reader, and mean data of the standard image and R, G and B components near each point P1 through P8 are obtained corresponding to the same positions.

To simplify the discussion, only the process of generating a correction table for a single component among the R, G and B components is described. It should be understood, however, that an identical process is executed for each R, G and B component when generating each image correction table. The image reading data characteristics are determined by generating a graft using data of one component at each point P1 through P8 from the read data of the standard image set as the horizontal axis, and the data of one component at each point P1 through P8 from the read data of the print set as the vertical axis. Interpolation data for areas outside the measurement area are determined by a suitable interpolation process. The image reading data characteristics are used to generate an image correction table so as to match the standard image data and the corrected print data as shown in the graph of the corrected image data characteristics.

The above example pertains to breaking down the RGB components, but CMYK or other color specification system may also be used.

FIGS. 7A and 7B show examples of image correction information tables. Information relating to the image reader used for correction and information relating to the image forming apparatus used for correction are used to select the image correction table. The image correction information include image reader information, image forming apparatus information and correction data update information (including the date), and the image reader information include identification information (network name, identification number and the like), manufacturer's name, product number, reading resolution, number of reading gradients and output data (RGB/CMYK). The image forming apparatus information include identification information (network name, identification number and the like), manufacturer's name, product number, printing resolution, number of print gradients and input data (RGB/CMYK). When an image correction table exists which corresponds to the combination of image reader and image forming apparatus being used, the image correction data having the most recent date are selected.

Even when an image correction table does not exist which corresponds to the combination of image reader 200 and image forming apparatus 300 being used, information is compared pertaining to the manufacturer of the device being used, product number, reading resolution, number of reading gradients, form of the output data (RGB/CMYK and the like), form of the input data (RGB/CMYK and the like), so as to use the image correction table of a combination having the highest similarity to the combination being used.

Figure 8:
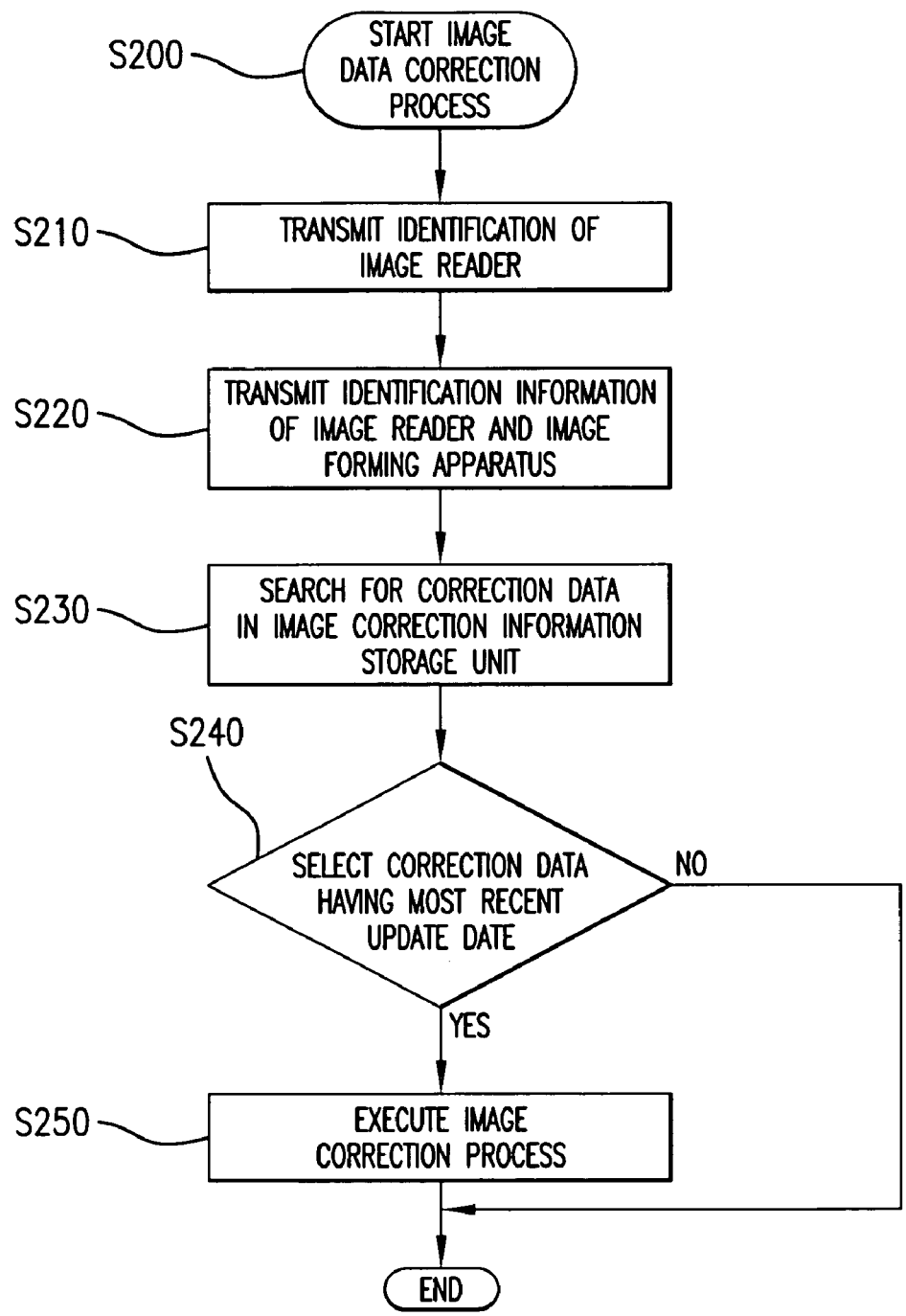
FIG. 8 is a flow chart of the process of image data correction in a second embodiment of the invention.

FIG. 8 shows the flow of the process executed by image data correction processor 160. When image data correction process step S200 starts, identification information for the image reader being used is transmitted in step S210.

Then, the process advances to step S220, and the identification information of image reader 200 and image forming apparatus 300 are transmitted. The identification information of image reader 200 and image forming apparatus 300 are as previously described.

In step S230, the identification information of image reader 200 and image forming apparatus 300 are used to search for correction data corresponding to this combination in the data space of correction data stored in image correction information storage unit 140.

In step S240, the result of the above search is used to select the correction data having the most recent update date when more than one correction data exists, the image correction process is executed (step S250) and the process ends. When there are no correction data, the process ends without execution of the correction process.

Figure 9:
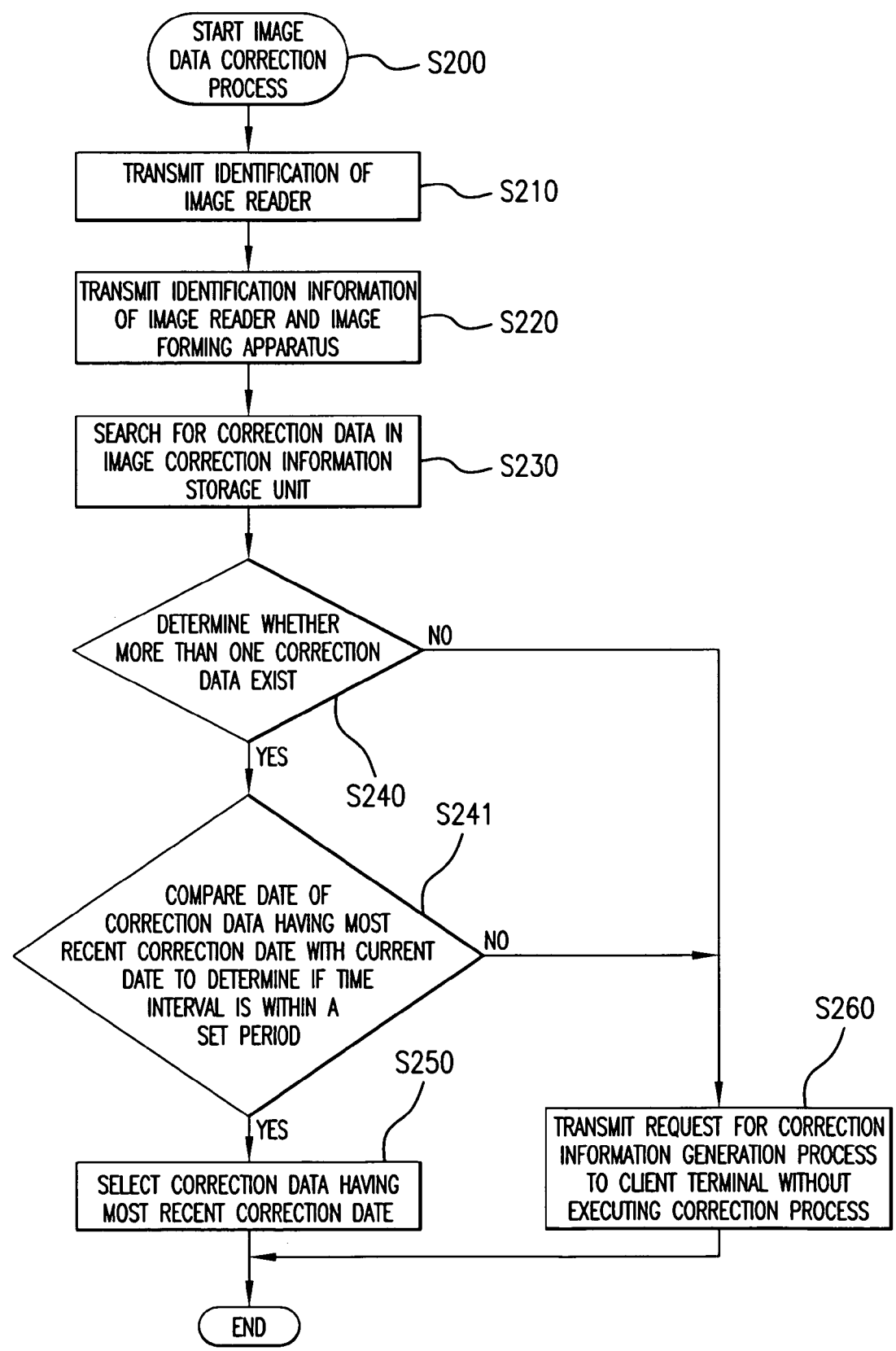
FIG. 9 is a flow chart of the process of image data correction in a third embodiment of the invention.

FIG. 9 illustrates the flow of the process executed by image data correction processor 160 relative to an example request by client terminal 400 to execute the correction process when a set time interval has elapsed after the correction execution date of the selected most recent image correction information.

When the image data correction process step S200 starts, processing is executed from step S210 to step S240 identical to that shown in FIG. 8. In step S240, a determination is made as to whether or not more than one correction data exists corresponding to the combination of devices being used, and when more than one correction data exists, in step S241, the correction data having the most recent correction date are selected from among the correction data corresponding to the devices being used, and the most recent correction date is compared to the current date, and if the time interval is within a set period the process advances to step S250, where the correction data having the most recent date is selected, and used to execute the image correction process, whereupon the process ends.

When a set time interval has elapsed, the process continues to step S260, and a request for the correction information generation process is transmitted to client terminal 400, and the process ends without execution of the correction process. When there are no correction data corresponding to the combination of devices being used in step S240, the request for the correction information generation process also is transmitted to client terminal 400 and the process ends without execution of the correction process.

Figure 10:
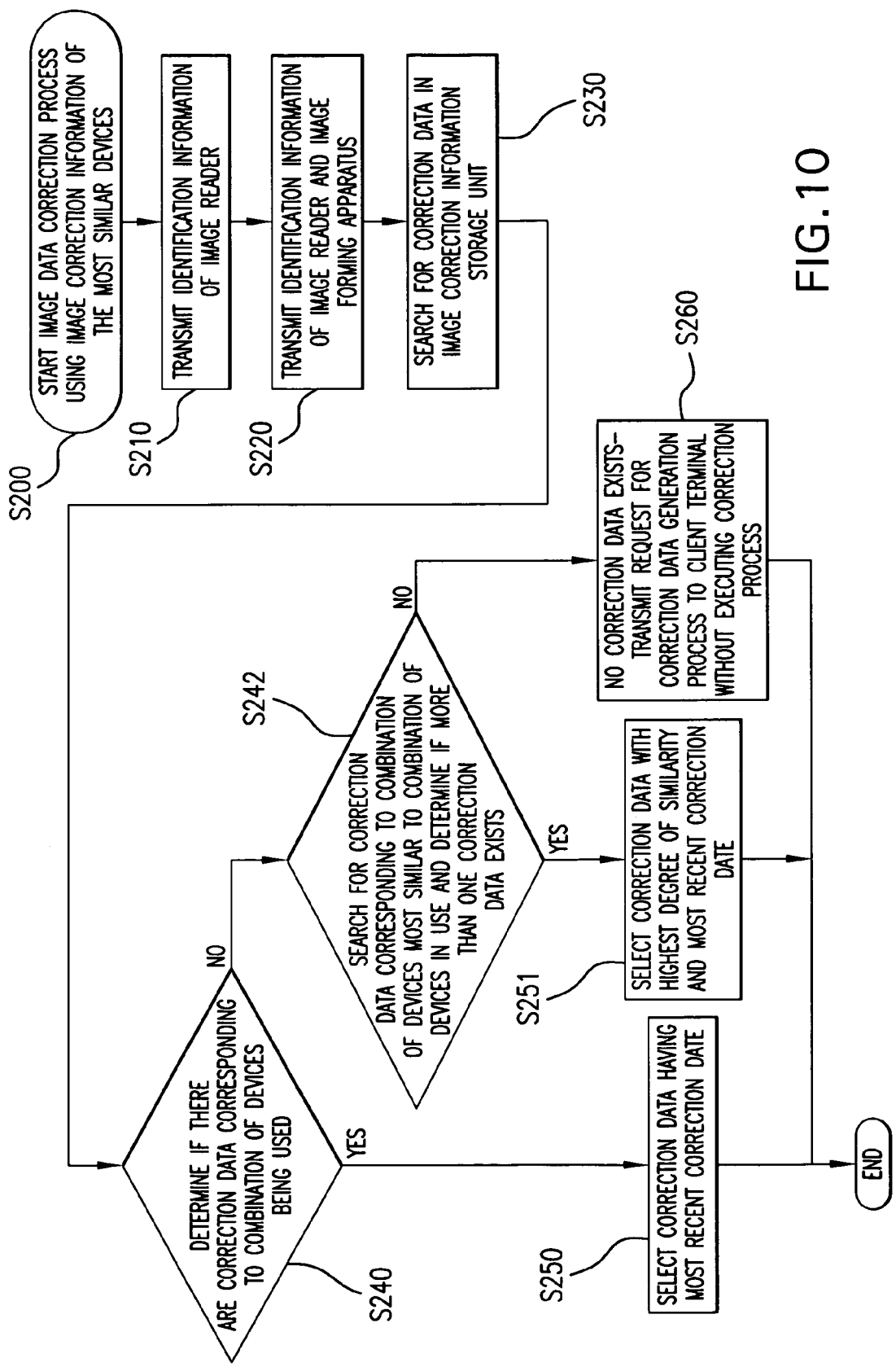
FIG. 10 is a flow chart of the process of image data correction in a fourth embodiment of the invention.

FIG. 10 shows the flow of the process executed by image data correction processor 160 corresponding to the example using image correction information of the most similar devices. The processes from step S210 to step S240 are identical to that of FIG. 8. When more than one correction data exist corresponding to the combination of devices being used, the process advances to step S250, the correction data having the most recent date is selected and the image correction process is executed, whereupon the process ends.

When there are no correction data corresponding to the combination of devices being used in step S240, the process continues to step S242, and the correction data corresponding to a combination of devices most similar to the combination of devices being used is searched using the device identification information of image reader 200 and image forming apparatus 300 in the data space of the correction data stored in image correction information storage unit 140. The search for similar devices is prioritized as follows: (1) matching of the manufacturer's product number and (2) matching the reading resolution and number of reading gradients, so as to determine the degree of similarity and select the correction data of the combination of devices of greatest similarity.

When more than one correction data exist for the combination of similar devices in step S242, the process continues to step S251, and the correction data having the highest degree of similarity and the most recent correction date are selected, and the image correction process is executed.

When there are no correction data for a combination of similar devices in step S242, the process continues to step S260, and a request for the correction information generation process is transmitted to client terminal 400, and the process ends without execution of the correction process. When searching for correction data of the combination of the most similar devices, it is possible to determine similarity by generating a database beforehand which stipulates the degree of similarity among devices.

The invention claimed is:

1. An image correction device for use in an image forming system which is connectable to a plurality of image readers and a plurality of image forming apparatuses, the image correction device comprising:
    a discriminating device for discriminating an image reader and an image forming apparatus which are connected to the image correction device;
    a memory for storing correction data relating to combinations of the image reader and image forming apparatus; and
    data correction means for correcting image data output from an image reader using the correction data relating to a specific combination of image reader and image forming apparatus and for outputting the corrected data to an image forming apparatus,
    wherein correction data relating to a first combination of image reader and image forming apparatus having the most similar characteristics to a second combination of image reader and image forming apparatus that does not have correction data stored in the memory are used for correcting the image data.

2. The image correction device of claim 1, wherein the plurality of image forming apparatuses are connected to a single image reader.

3. The image correction device of claim 1, wherein the plurality of image readers are connected to a single image forming apparatus.

4. The image correction device of claim 1, wherein the correction data for color printing include various combinations of gradient correction data, resolution data, density correction data and color correction data.

5. The image correction device of claim 1, wherein the correction data for monochrome printing include various combinations of halftone correction data, resolution data and density correction data.

6. The image correction device of claim 1, wherein the data correction means corrects the image data from the image reader based on updated correction data stored in the memory, and outputs the corrected data to the image forming apparatus.

7. The image correction device of claim 1, further comprising means for requesting regeneration of the correction data to update the correction data stored in the memory when a set time interval has elapsed after the last update of the correction data.

8. The image correction device of claim 1, wherein the device is a data processing device.

9. The image correction device of claim 1, further comprising means for generating correction data by comparing first image data with second image data, wherein the first image data is stored in the memory and outputted to the image forming apparatus and the second image data is created with the image reader by reading the image formed with the image forming apparatus based on the first image data.

10. An image correction device for use in an image forming system which is connectable to a plurality of image readers and a plurality of image forming apparatuses, the image correction device comprising:
   a discriminating device for discriminating an image reader and an image forming apparatus which are connected to the image correction device;
   a memory for storing correction data relating to combinations of the image reader and image forming apparatus;
   data correction means for correcting image data output from an image reader using the correction data relating to a specific combination of image reader and image forming apparatus and for outputting the corrected data to an image forming apparatus; and
   means for searching for correction data relating to a first combination of image reader and image forming apparatus having the most similar characteristics to a second combination of image reader and image forming apparatus that does not have correction data stored in the memory.

11. An image forming system comprising:
   a plurality of image readers;
   a plurality of image forming apparatuses; and
   an image correction device which is connected to the plurality of image readers and the plurality of image forming apparatuses over a network for handling image correction for the whole network of the plurality of image readers and the plurality of image forming apparatuses, said image correction device including:
   a discriminating device for discriminating the plurality of image readers from the plurality of image forming apparatuses which are connected to the image correction device,
   a memory for storing correction data relating to combinations of the image readers and image forming apparatuses, and
   data correction means for correcting image data output from an image reader using the correction data relating to a specific combination of image reader and image forming apparatus and for outputting the corrected data to an image forming apparatus.

12. The image forming system of claim 11, wherein the image correction device is a server.

13. The image forming system of claim 11, wherein the image correction device is a controller.

14. The image forming system of claim 11, wherein the image correction device is an image transmission device.

15. A computer-readable storage medium for storing program software of an image correction device used in an image forming system connectable to a plurality of image readers and a plurality of image forming apparatuses, wherein the computer-readable storage medium stores a storage program including correction data relating to specific combinations of the plurality of image readers and the plurality of image forming apparatuses and a data correction control program for correcting image data output from an image reader using the correction data relating to a specific combination of image reader and image forming apparatus and transmitting the corrected data to an image forming apparatus when image formation is executed, wherein the computer readable storage medium further stores a search control program for searching for correction data relating to a first combination of image reader and image forming apparatus having the most similar characteristics to a second combination of image reader and image forming apparatus which does not have correction data stored on the computer-readable storage medium.

16. The computer-readable storage medium for storing program software of claim 15, wherein the data correction control program further includes a program for correcting the image data from the image reader based on updated correction data.

17. The computer-readable storage medium for storing program software of claim 15, wherein the storage medium further stores a correction data regeneration request program for requesting the regeneration of the correction data when a set time interval has elapsed after the last update of the correction data.

18. An image correction method for use in an image forming system which is connectable to a plurality of image readers and a plurality of image forming apparatuses, the image correction method is used for suppressing distortion in the image forming system by using optimum image correction information corresponding to mechanical differences and changes over time in the plurality of image readers and the plurality of image forming apparatuses, the image correction method comprising the steps of:
   discriminating an image reader and an image forming apparatus which are connected to the image correction device;
   storing correction data relating to combinations of the image readers and image forming apparatuses;
   correcting image data output from an image reader using the correction data relating to a specific combination of image reader and image forming apparatus and outputting the corrected data to an image forming apparatus; and
   searching for correction data relating to a first combination of image reader and image forming apparatus having the most similar characteristics to a second combination of image reader and image forming apparatus that does not have correction data.

19. The image correction method of claim 18, wherein the correcting step corrects the image data from the image reader based on updated correction data and outputs the corrected data to the image forming apparatus.

20. The image correction method of claim 18, further comprising the step of requesting regeneration of the correction data to update the correction data when a set time interval has elapsed after the last update of the correction data.

21. An image correction method for use in an image forming system which is connectable to a plurality of image readers and a plurality of image forming apparatuses, the image correction method is used for suppressing distortion in the image forming system by using optimum image correction information corresponding to mechanical differences and changes over time in the plurality of image readers and the plurality of image forming apparatuses, the image correction method comprising the steps of:

discriminating an image reader and an image forming apparatus which are connected to the image correction device;

storing correction data relating to combinations of the image readers and image forming apparatuses;

correcting image data output from an image reader using the correction data relating to a specific combination of image reader and image forming apparatus and outputting the corrected data to an image forming apparatus, wherein the correction data relating to a first combination of image reader and image forming apparatus having the most similar characteristics to a second combination of image reader and image forming apparatus that does not have correction data are used for correcting the image data.

\* \* \* \* \*